SYNCHRONIZING ARRANGEMENT

Filed Jan. 26, 1962

INVENTORS
JAMES V. FAYER &
GERALD SPECTOR
BY John V. Regan
Attorney 3,243,665
SYNCHRONIZING ARRANGEMENT
James V. Fayer, Lindenwold, N.J., and Gerald Spector, Philadelphia, Pa., assignors to Radio Corporation of America, a corporation of Delaware
Filed Jan. 26, 1962, Ser. No. 168,988
2 Claims. (Cl. 317—137)

This invention relates generally to apparatus wherein selected ones of a number of devices are activated simultaneously on command and, in particular, to control means for simultaneously activating preselected solenoids in response to a clock or timing signal.

Card and tape punch mechanisms, or perforators, and electro-mechanical printers are examples of apparatus which employ a number of solenoid-actuated devices, either punches or printer hammers, respectively. It is desired in each of these apparatus to energize preselected ones of the solenoids simultaneously during an operating cycle to effect the simultaneous recording of information at corresponding locations of a recording medium. A typical punched card may have M columns and N rows of information storage locations, each storage location being defined by the intersection of a row and a column. The card may be punched at any desired storage location and, when a card is fed in row-by-row fashion to a punching station, all of the desired locations in a given row are punched simultaneously when that row is in punching position at the station.

A register of M bistable devices may store the information to be punched in a row of the card. Associated with each bistable device is a different one of M solenoids and associated punches. In order to provide the control necessary for effecting simultaneous energization of the selected ones of the solenoids, it has been customary in the prior art to employ two-input coincidence or "and" gates, one for each of the solenoids. Each solenoid is connected to the output of its respective "and" gate, usually by way of a current amplifier. The output of each bistable device is supplied to one input of its associated "and" gate, and common clock or timing signals are supplied to the other input of all of the "and" gates. A solenoid is energized only when both of the inputs to its associated "and" gate are energized.

Among the disadvantages of this prior art system are the large number of "and" gates required, and the consequent high cost, high space requirements and increased susceptibility of the system to component failure.

Accordingly, it is one object of the present invention to provide a synchronizing or control arrangement which does not require a separate coincidence gate for each solenoid.

Another disadvantage of the prior art system is that the circuit delays of the various coincidence gates and associated amplifiers may not be uniform, whereby certain ones of the preselected solenoids may be activated before others in point of time. This condition is especially undesirable in high speed printers in which the print hammers strike moving type font, since nonuniformities in the circuit delays may result in misregistration of the characters in a line of print.

It is another object of this invention to provide improved control means for synchronizing the activation of selected current operated devices, solenoids in particular.

It is a still further object of the invention to provide a circuit for activating preselected current operated devices in response to a command or timing signal, wherein the duration of the timing signal is not critical and wherein only a small load is imposed on the timing signal source.

In accordance with the present invention, a separate electronic switch is provided for each of the solenoids. Each electronic switch has first and second electrodes defining a current carrying path, and a control electrode responsive to signals for controlling the conductivity of the current carrying path. Each solenoid is connected in series with a different current carrying path between a first common junction and a second common junction. A common switch means and a source of energizing potential are serially connected between the first and second junctions. Substantially no current can flow through any solenoid unless the associated electronic switch and the common switch means are closed at the same time. Input signals are applied to preselected ones of the electronic switch control electrodes to precondition these switches for conduction. A timing signal then applied to the control electrode of the common switch means closes the latter switch and allows current to flow through the preselected electronic switches and associated solenoids.

According to one feature of the invention, the electronic switches may be transistor amplifiers controlled by the individual bistable storage devices. An amplifier is biased either in the nonconducting condition or into heavy conduction corresponding to the reset and set states, respectively, of the associated bistable storage device.

According to another feature of the invention, the common switch means may be a bistable element of the thyratron type, such as a silicon controlled rectifier. The bistable element, once triggered, or set, remains in a low impedance condition until the current through the element falls below a certain value. The element is reset automatically when the bistable storage devices are reset, since there is then no complete path for current flowing through the element.

In the accompanying drawing, like reference numerals refer to like components, and:

Figures 1, 2:
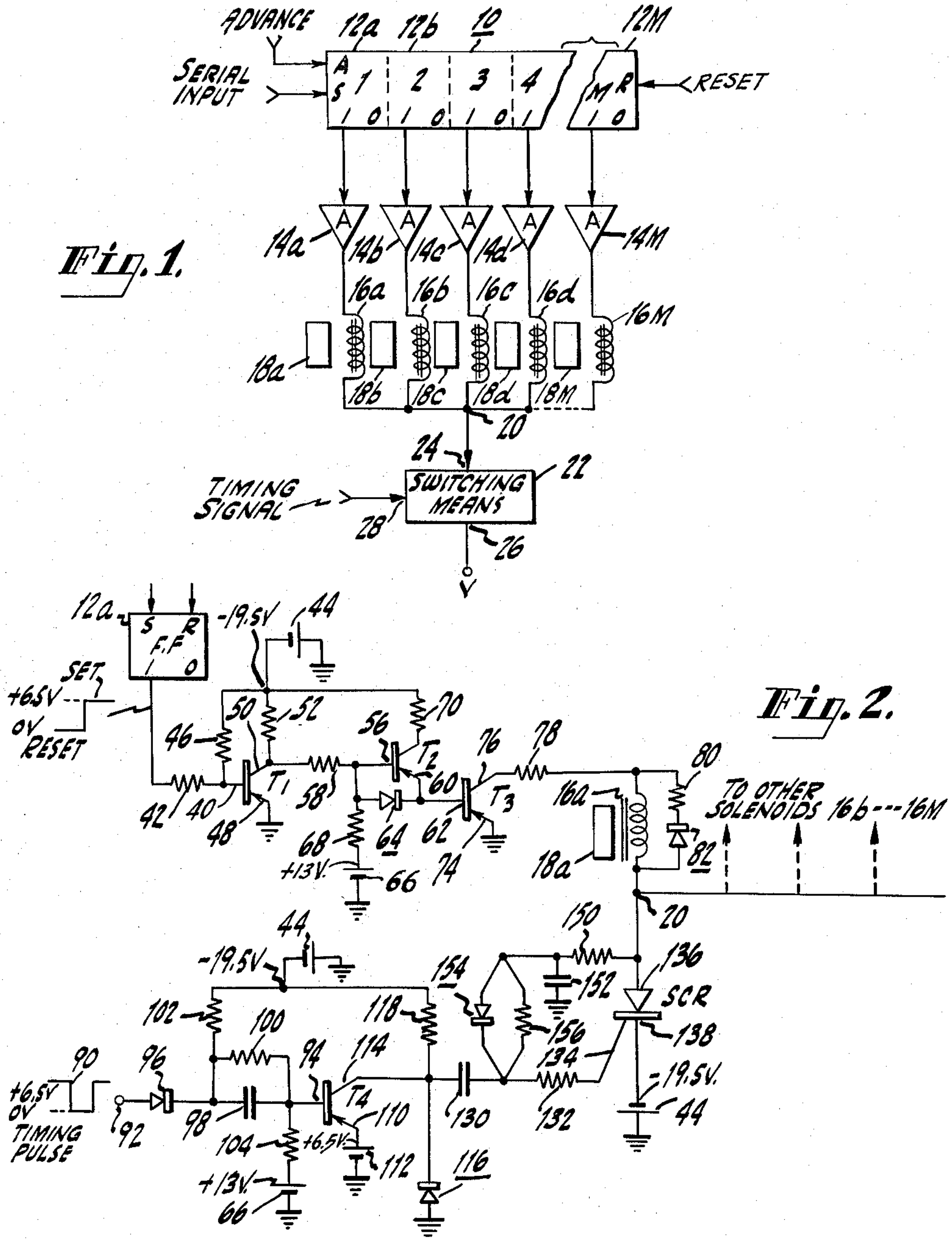
FIGURE 1 is a block diagram of the invention.
FIGURE 2 is a schematic diagram of one of the solenoid circuits of FIGURE 1.

In FIGURE 1, there is illustrated a fragmentary view of an M stage shift register 10 comprising M bistable storage devices 12*a* . . . 12*m*. Information may be entered serially into the shift register 10 by applying input signals at an input terminal S. This information is shifted or advanced from stage to stage, toward the right as viewed in the drawing, in response to advance signals applied at a common advance terminal A. Each of the bistable storage devices 12*a* . . . 12*m* has a reset terminal connected in common to all other reset terminals, and a pulse of the proper polarity applied at the common reset terminal R resets all of the bistable storage devices to an initial state. Each of the stages 12*a* . . . 12*m* also has first and second output terminals (1) and (0) at which appear complementary output signals. For example, the voltage at the (1) output terminal is high, relatively speaking, when the voltage at the (0) output terminal of the same stage is low, relatively speaking, and vice versa. Information is read out of the register 10 in parallel at the (1) output terminals.

The shift register 10 may store the information to be punched in M positions of a record card or tape, or the information to be printed in M positions of a record medium for example. In the former case, punches associated with the bistable storage devices which are "set" to be actuated simultaneously during an operating cycle. The operating cycle may consist of a read-in portion and a punch portion during which information is read into the shift register 10 and the desired punches are actuated, respectively.

Each of the bistable storage devices 12$a$ . . . 12$m$ of the shift register 10 has associated therewith a separate solenoid 16$a$ . . . 16$m$, respectively, for actuating the associated punch or print hammer 18$a$ . . . 18$m$, respectively. The (1) output terminal of each of the bistable devices 12$a$ . . . 12$m$ is applied to the control electrode of a separate signal controlled switching device 14$a$ . . . 14$m$, respectively, which may be an amplifier for example, having a current carrying path connected in series with the associated solenoid 16$a$ . . . 16$m$, respectively. A switching device 14 may be biased in the nonconducting condition when the associated bistable device 12 is reset, and may be biased into heavy conduction when the associated bistable device is set.

One end of each of the solenoids 16$a$ . . . 16$m$ is connected to a common junction point 20. A common switching means 22 is provided for simultaneously energizing all of the selected solenoids 16$a$ . . . 16$m$. The switching means 22 is a signal controlled device having first and second electrodes 24 and 26 defining a current carrying path or channel, and a control electrode 28 responsive to timing signals for controlling the conductivity of the path. The path normally is open, that is to say the impedance of the path normally is extremely high, in the absence of a timing signal, whereby no current can flow through any of the solenoids 16$a$ . . . 16$m$. A timing signal is applied to the control electrode 28 after information is entered into the shift register 10. This timing signal acts to close the conducting path and allows current to flow through the selected solenoids 16$a$ . . . 16$m$ to a source of energizing potential, designated V.

A schematic diagram of the switching means 22 and one of the amplifiers 14$a$ is illustrated in FIGURE 2. The amplifier 14$a$ includes three transistors $T_1$, $T_2$ and $T_3$. The base electrode 40 of the first transistor $T_1$ is connected to the (1) output terminal of the bistable storage device 12$a$ by way of an input resistor 42 and also is connected to the negative terminal of an energizing source, indicated as a battery 44, by way of a resistor 46. The emitter electrode 48 of the transistor $T_1$ is connected to a point of reference potential, indicated in the drawing by the conventional symbol for circuit ground. The collector electrode 50 is connected to the negative terminal of the battery 44 by a resistor 52. The output of the transistor $T_1$ is supplied to the base 56 of the transistor $T_2$ by a resistor 58. The emitter electrode 60 of transistor $T_2$ is directly connected to the base electrode 62 of the transistor $T_3$. A diode 64 is connected between the base 56 and the emitter 60 of the transistor $T_2$ and is poled in a direction to protect the transistor $T_2$ by preventing the base 56 from becoming reverse biased with respect to the emitter 60 by more than a fraction of a volt. The base 56 is connected to the positive terminal of a battery 66 by way of a resistor 68.

The emitter electrode 74 of the transistor $T_3$ is connected directly to ground, and the collector 76 is connected through a current limiting resistor 78 to the upper terminal of the solenoid 16$a$. A resistor 80 and a diode 82 are serially connected across the terminals of the solenoid 16$a$.

The switching means 22 is schematically illustrated in the lower half of FIGURE 2, and preferably includes a transistor $T_4$ and a high power bistable element, such as a silicon controlled rectifier SCR. Timing pulses 90 applied at input terminal 92 are coupled to the base 94 of the transistor $T_4$ by way of a diode 96 and the parallel combination of a capacitor 98 and a resistor 100. A resistor 102 is connected between the junction of the diode 96 and the capacitor 98 to the negative terminal of the battery 44. A resistor 104 is connected between the base electrode 94 and the positive terminal of the battery 66. The emitter electrode 110 of the transistor $T_4$ is connected to the positive terminal of another battery 112. In the absence of a timing pulse 90, the transistor $T_4$ is biased beyond cutoff and the collector 114 is clamped at approximately ground potential by a clamping diode 116. A negative going timing pulse 90 overcomes the bias and turns the transistor $T_4$ on. The voltage at the collector 114 then is approximately +6.5 volts, the value of the battery 112.

The output of the transistor $T_4$ is coupled through a capacitor 130 and a resistor 132 to the gate electrode 134 of the SCR. The anode 136 of the SCR is connected to the common junction point 20, and the cathode 138 is connected to an energizing source, which may be the battery 44. A resistor 150 and a capacitor 152 are connected in series between the anode 136 and circuit ground. A diode 154 and a resistor 156 are connected in parallel between the ungrounded plate of the capacitor 152 and the junction of the capacitor 130 and resistor 132.

A silicon controlled rectifier, as is known, is a bistable device having a negative resistance characteristic. The operation of an SCR is analogous to that of a thyratron or ignitron, for example, in that the device, once triggered into conduction, remains in a high conductive state after the triggering pulse is terminated. The gate 134 loses control after the SCR is triggered and the SCR is reset to the nonconducting condition by reducing the current flow therethrough below a predetermined value.

Consider now the operation of the circuit. The conducting path for the solenoid 16$a$ is from ground through the emitter-collector path of the transistor $T_3$, the current limiting resistor 78, and the anode-cathode path of the SCR to the battery 44. The solenoid 16$a$ is activated only when both the transistor $T_3$ and the SCR are in the high conducting condition. Assume first that the bistable storage device 12$a$ is in the reset state. The voltage at the (1) output terminal of the bistable device 12$a$ then is approximately zero volts. The transistor $T_1$ conducts at this time because of the voltage divider arrangement of resistors 42 and 46 connected between the (1) terminal and the battery 44. The voltage at the collector electrode 50 of $T_1$ is approximately at ground potential, and the transistor $T_2$ is biased beyond cutoff. Transistor $T_3$ also is biased beyond cutoff at this time, and no current can flow through the solenoid 16$a$.

Information is entered into the shift register 10 of FIGURE 1 during the first portion of an operating cycle. Assume that the bistable device 12$a$ is set after the information is entered into the shift register 10. The voltage at the (1) output terminal of the bistable device 12$a$ then is approximately +6.5 volts. The values of the resistors 42 and 46 are selected so that the transistor $T_1$ is biased beyond cutoff when the bistable device 12$a$ is set. The voltage at the collector electrode 50 then falls to a negative value and turns the transistor $T_2$ on. Assuming that the base current of the transistor $T_2$ is $I_1$ and the beta of the transistor $T_2$ is $\beta_1$, the forward base current supplied to the transistor $T_3$ then is $I_1(\beta_1+1)$. The transistor $T_3$ can supply a current $\beta_2 I(\beta_1+1)$ to the solenoid 16$a$ when the SCR fires, where $\beta_2$ is the beta of $T_3$. Essentially, the combination of transistors $T_2$ and $T_3$ serves as a high current switch.

A timing pulse 90 is supplied at the input terminal 92 after the information is entered into the shift register 10. This negative timing pulse 90, as described previously, turns the transistor $T_4$ on, and a positive pulse is coupled through the capacitor 130 to the gate electrode 134 of the SCR. The SCR then "fires," providing a low impedance path between the negative terminal of the battery 44 and the common junction point 20, and supplying current to the solenoid 16$a$ and all other preselected solenoids 16$b$ . . . 16$m$ whose associated bistable devices are set.

The anode 136 and gate 134 voltages of the SCR are approximately −19 volts after the SCR fires. The capacitor 152 at the anode 136 of the SCR serves as a filter to maintain this voltage constant. The SCR, once fired, remains in a low impedance condition until the current therethrough is reduced to a low value. The timing pulse 90 need only be applied for a short time since the gate electrode 134 loses control of the SCR once the SCR fires. When the timing pulse 90 terminates, however, the transistor $T_4$ turn off and a negative pulse is coupled through the capacitor 130. Because of the characteristics of the SCR, it is desirable that the voltage at the gate electrode 134 not go more than approximately ½ volt negative with respect to the cathode 138. The diode 154 is provided for clamping the gate voltage at approximately −19 volts when the timing signal is terminated and the SCR is on. This diode 154 conducts when the aforementioned negative-going pulse occurs, preventing a negative pulse from being applied to the SCR gate 134 when the timing pulse 90 is terminated. The resistor 156 is provided for charging the capacitor 130.

The SCR is automatically reset to the high impedance condition when the shift register 10 is reset. Resetting the shift register 10 has the effect of turning on all of the transistors $T_1$ and turning off all of the transistors $T_2$ and $T_3$ to interrupt the current path through the solenoids and the SCR. The current through the SCR then falls below the holding value, whereby the SCR resets automatically. The combination of the resistor 80 and diode 82 in parallel with the solenoid **16*a* is provided for dissipating the energy in the solenoid 16*a* when the transistor $T_3$ is turned off. This resistor-diode combination prevents a high counter EMF from building up across the solenoid 16*a* and damaging either the transistor $T_3$ or the solenoid 16*a***.

It should be noted that the SCR, when fired, activates all of the preselected solenoids **16*a* . . . 16*m* simultaneously, since the selected ones of the transistors $T_3$ in the various solenoid circuits are already preconditioned for heavy conduction before the timing pulse 90 is applied. Moreover, the duration of the timing pulse 90** is not critical; it need only be applied long enough to fire the SCR. The load on the timing signal source (not shown) is small compared to systems wherein the timing pulse must be applied to numerous coincidence gates. Also, no monostable circuits are needed, as in some prior art systems, for adjusting the width of the solenoid energizing pulse. In some cases where a very large number of solenoids are employed, it may be desirable to parallel two or more SCR's in order to supply sufficient current for all of the solenoids. However, it the latter case, the SCR control circuit illustrated in FIGURE 2 may be used to control several SCR's.

By way of example only, the values of the various components in one operative embodiment of the invention were as follows:

Resistors:

| | | |
|---|---|---|
| #42 | ohms | 1.3K |
| #46 | do | 75K |
| #52 | ohms (2 watt) | 620 |
| #58 | ohms | 390 |
| #68 | do | 1.6K |
| #70 | ohms (4 watt) | 360 |
| #78 | ohms (5 watt) | 7.5 |
| #100 | ohms | 820 |
| #102 | ohms (1 watt) | 2.7K |
| #104 | ohms | 2.2K |
| #118 | do | 4.3K |
| #132 | do | 75 |
| #150 | do | 1K |
| #156 | do | 1K |

Capacitors:

| | | |
|---|---|---|
| #98 | microfarads | 620 |
| #130 | do | 2.2 |
| #152 | do | 15 |

Bias sources:

| | | |
|---|---|---|
| #44 | volts | 19.5 |
| #66 | do | 13 |
| #112 | do | 6.5 |

Transistors:

| | |
|---|---|
| $T_1$ | 2N404 |
| $T_2$ | 2N404 |
| $T_3$ | 2N1183 |
| $T_4$ | 2N1300 |

All of the resistors are one-half watt, except where indacted. The diodes may be either silicon or germanium.

What is claimed is:

1. The combination comprising:

a number of solenoids;

a like number of amplifiers each having an output electrode and a common electrode defining a current carrying path, and having a control electrode;

a like number of bistable storage devices each having an output electrode connected to a different said control electrode, the voltage applied at a said control electrode having a value to bias the associated said amplifier into the nonconducting condition and into heavy conduction as the associated bistable device is in the reset and set states, respectively;

means connecting each of said solenoids in series with a different said current carrying path between a first common terminal and a second common terminal;

a bistable storage element having a control electrode, and output and common electrodes defining a conducting channel;

means connecting said conducting channel between said first terminal and said second terminal;

means for selectively setting desired ones of said bistable devices;

means for applying a control signal to the control electrode of said bistable element after the desired said bistable devices are switched to set state; and means for resetting said bistable devices.

2. The combination comprising:

a plurality of loads;

a like plurality of amplifiers each having an output electrode and a common electrode defining a current carrying path, and having a control electrode;

a like plurality of bistable storage devices each having an output electrode coupled to a different said control electrode, the voltage applied at a said control electrode having a value to bias the associated said amplifier into the nonconducting condition and into heavy conduction as the associated bistable device is in the reset and set states, respectively;

means connecting each of said loads in series with a different said current carrying path between a first common terminal and a second common terminal;

a bistable storage element having a control electrode, and output and common electrodes defining a conducting channel, said element having the characteristic that, once triggered, it remains in a state of relatively high conductivity so long as the current through the conducting channel exceeds a certain value;

means for connecting a source of energizing potential in series with said conducting channel between said first common terminal and said second common terminal, said loads and the associated current carrying paths furnishing the sole paths for current flowing through the conducting channel of said bistable element;

means for selectively setting desired ones of said bistable devices;

means for applying a control signal to the control electrode of the bistable element to trigger the bistable element after the desired said bistable devices are in the set state; and means for resetting said bistable devices.

References Cited by the Examiner

UNITED STATES PATENTS

| | | | |
|---|---|---|---|
| 2,432,787 | 12/1947 | Nichols | 234—108 X |
| 2,994,071 | 7/1961 | Olson et al. | 317—137 X |
| 3,069,600 | 12/1962 | Leeson et al. | 317—148.5 |
| 3,097,307 | 7/1963 | Bonn | 307—88.5 |

OTHER REFERENCES

Publication (A): "A Survey of Some Circuit Applications of the Silicon Controlled Switch and Silicon Controlled Rectifier," Applications and Circuit Design Notes, Solid State Products, Inc., bulletin D420-02-12-59, pages 4, 5 and 7, December 1959.

SAMUEL BERNSTEIN, *Primary Examiner.*

L. T. HIX, *Assistant Examiner.*